US 6,552,733 B1

(12) United States Patent
Taylor et al.

(10) Patent No.: US 6,552,733 B1
(45) Date of Patent: Apr. 22, 2003

(54) CONFIGURABLE VERTEX BLENDING CIRCUIT AND METHOD THEREFORE

(75) Inventors: Ralph Clayton Taylor, Deland, FL (US); Michael Andrew Mang, Ovledo, FL (US)

(73) Assignee: ATI International, SRL, Christchurch (BB)

( * ) Notice: Subject to any disclaimer, the term of this patent is extended or adjusted under 35 U.S.C. 154(b) by 0 days.

(21) Appl. No.: 09/552,931

(22) Filed: Apr. 20, 2000

(51) Int. Cl.$^7$ ................................................. G09G 5/39
(52) U.S. Cl. ........................ 345/619; 345/643; 345/644; 345/646
(58) Field of Search ................................ 345/582, 589, 345/606, 619, 646, 643, 644, 561, 571

(56) References Cited

U.S. PATENT DOCUMENTS

| 5,416,899 | A | * | 5/1995 | Poggio et al. | 395/152 |
| 5,590,261 | A | * | 12/1996 | Sclaroff et al. | 395/173 |
| 5,933,150 | A | * | 8/1999 | Ngo et al. | 345/473 |
| 6,144,365 | A | * | 11/2000 | Young | 345/153 |
| 6,163,319 | A | * | 12/2000 | Peercy et al. | 345/426 |
| 6,320,583 | B1 | * | 11/2001 | Shaw et al. | 345/433 |
| 6,353,439 | B1 | * | 3/2002 | Lindholm et al. | 345/561 |

* cited by examiner

Primary Examiner—Jeffery Brier
Assistant Examiner—David J Chung
(74) Attorney, Agent, or Firm—Vedder, Price, Kaufman & Kammholz (57) ABSTRACT

A configurable vertex blending circuit that allows both morphing and skinning operations to be supported in dedicated hardware is presented. Such a configurable vertex blending circuit includes a matrix array that is used for storing the matrices associated with the various portions of the vertex blending operations. Vertex data that is received is stored in an input vertex buffer that includes multiple position buffers such that the multiple positions associated with morphing operations can be stored. Similarly, the single position typically associated with skinning operations can be stored in one of the position buffers. The input vertex buffer further stores blending weights associated with the various component operations that are included in the overall vertex blending operation. An arithmetic unit, which is configured and controlled by a transform controller, performs the calculations required for each of a plurality of component operations included in the overall vertex blending operation. The results of each of these component operations are then combined to produce a blended vertex.

22 Claims, 3 Drawing Sheets

CONFIGURABLE VERTEX BLENDING CIRCUIT AND METHOD THEREFORE

FIELD OF THE INVENTION

The invention relates generally to graphics processing and more particularly to a configurable vertex blending circuit and method for use.

BACKGROUND OF THE INVENTION

As computers continue to evolve, more complex three-dimensional (3D) graphics processing operations are utilized by various computer applications. Typically, the processing operations required for drawing 3D objects in a 3D setting are very complex. In many cases, these processing operations are performed at least partially using software running on the central processing unit (CPU) within the computer system. In many cases, this consumes significant amounts of the CPU's processing bandwidth such that there is less remaining bandwidth for performing other computational operations. As such, it is desirable to have dedicated circuitry perform as much of the graphics processing operations as possible.

In order to include a 3D object in a display image, a model is often constructed for the object in a coordinate system that is well suited for the construction of such models. This is often referred to as constructing a model in the object coordinate system, which may also be referred to as a model coordinate system. In order to project, or map this model into an environmental setting corresponding to an image, matrix operations are often used to perform such projections. For example, a model matrix may be used to put the model for the object into a world perspective (e.g. project the model for a bottle onto a table included in the "world" perspective within which the bottle exists). Such matrix operations are typically applied to each vertex of the model individually.

$$\begin{bmatrix} x \\ y \\ z \\ w \end{bmatrix} \begin{bmatrix} 4 \times 4 \\ \text{Model} \\ \text{Matrix} \end{bmatrix} = \begin{bmatrix} x \\ y \\ z \\ w \end{bmatrix}$$

Object Vertex      World Vertex

A similar matrix operation may be performed such that the perspective of the viewer of the scene within which the object is included is taken into account. As such, as the perspective of the viewer changes, the orientation of the different objects within the displayed image will change. The matrix utilized to perform such alterations based on perspective of the viewer is commonly referred to as a view matrix. In order to simplify the matrix operations, the model and view matrices may be combined to produce a composite matrix such that only one matrix mathematical operation must be performed.

Relationships between different objects, or portions of objects, on the display can create problematic situations that can result in image aberrations. For example, if an arm or similar appendage is constructed of a forearm construct as well as an upper arm construct, the two constructs, or objects, are interrelated in that they share a common boundary at a joint (the elbow). Techniques such as "skinning" have been developed to allow each object to be treated individually, while ensuring that their interrelationship is maintained by allowing vertices to be shared by objects. Weighted calculations are performed to determine the final location of the shared vertices within the view space such that display aberrations are minimized. Such skinning operations only utilize a single position for each vertex that is blended, and multiple matrices and blending weights are applied to the position to determine the resulting blended vertex. Circuitry designed to perform such operations exists in the art, but does not provide the level of flexibility required for the implementation of other three-dimensional processing operations that are becoming increasingly desirable as graphics processing continues to evolve.

One application that is becoming more prominent in graphics processing is morphing, or "tweening". In morphing operations, the displayed image initially shows one object, and is gradually altered such that a second object is gradually phased in as the first object is phased out. Examples commonly seen in video productions include the morphing of one person's face to that of another, where the interchange between the two faces is so gradual that an impressive effect is created. In current graphics processing systems, the operations required for performing the morphing operations are typically performed in software. As described earlier, such complex software calculations are undesirable as they consume processing bandwidth that may be better utilized for other operations.

Therefore, a need exists for a vertex blending circuit that is configurable in a manner such that complex graphics processing operations involving matrix calculations can be performed using dedicated hardware such that processing bandwidth within the central processor of the computing system is offloaded.

DETAILED DESCRIPTION

Generally, the present invention provides a configurable vertex blending circuit that allows both morphing and skinning operations to be supported in dedicated hardware. Such a configurable vertex blending circuit includes a matrix array that is used for storing the matrices associated with the various portions of the vertex blending operations. Vertex data that is received is stored in an input vertex buffer that includes multiple position buffers such that the multiple positions associated with morphing operations can be stored. Similarly, the single position typically associated with skinning operations can be stored in one of the position buffers. The input vertex buffer further stores blending weights associated with the various component operations that are included in the overall vertex blending operation. An arithmetic unit, which is configured and controlled by a transform controller, performs the calculations required for each of a plurality of component operations included in the overall vertex blending operation. The results of each of these component operations are then combined to produce a blended vertex.

By including the capability for the vertex blending circuit to perform morphing operations in hardware, the central processing unit or other processor within the computing system that performs such morphing operations can be offloaded. By allowing the vertex blending circuit to be configurable such that it can also support skinning operations, the total circuitry required for implementing morphing and skinning operations within a video graphics system is minimized. As such, overall system cost and complexity is reduced.

Figure 1:
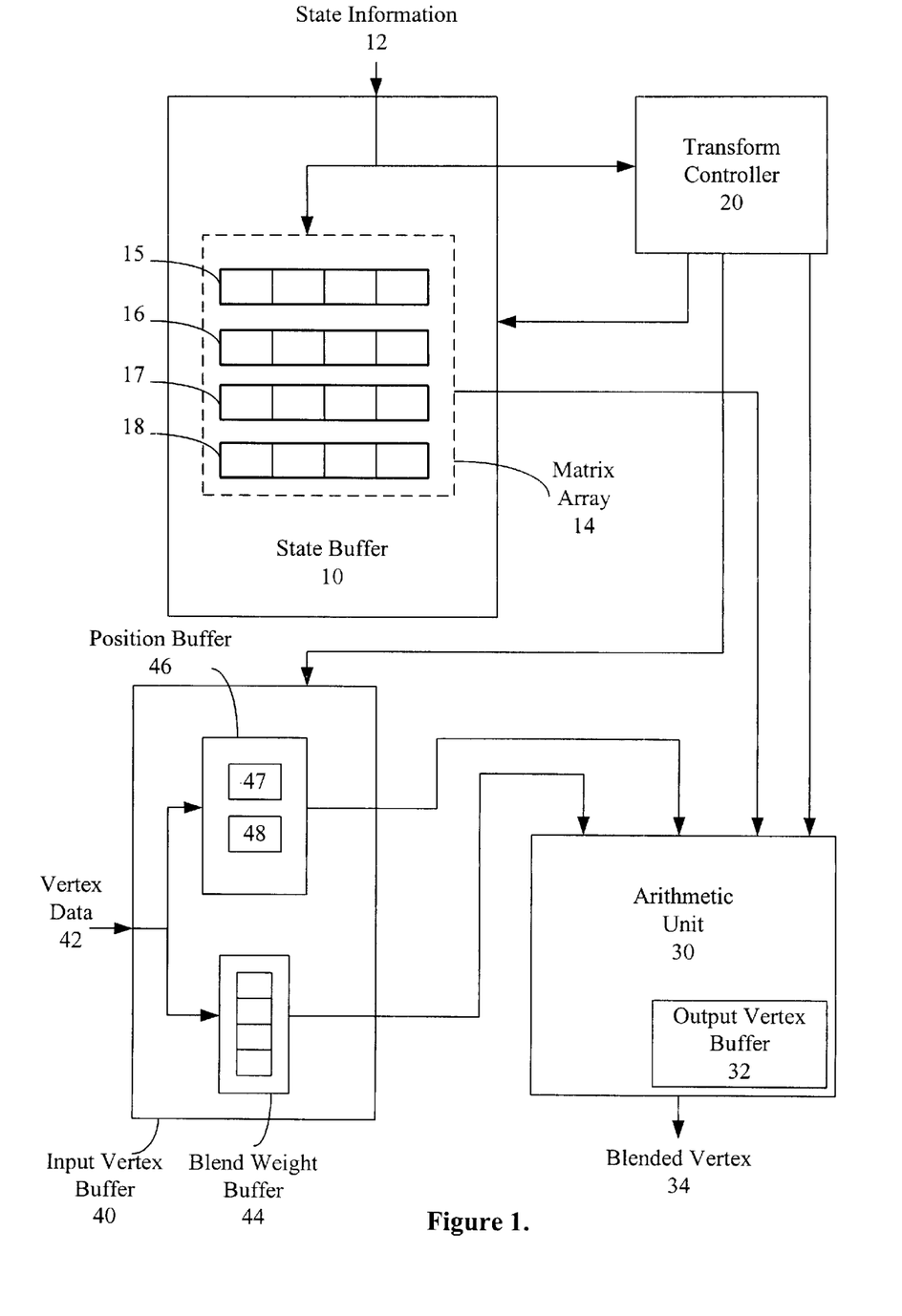
FIG. 1 illustrates a block diagram of a vertex blending circuit in accordance with a particular embodiment of the present invention.

The invention can be better understood with reference to FIGS. 1–5. FIG. 1 illustrates a vertex blending circuit for performing vertex blending operations. The vertex blending circuit includes a state buffer 10, a transform controller 20, an arithmetic unit 30, and an input vertex buffer 40. The vertex blending circuit of FIG. 1 is configurable such that both morphing and skinning operations can be performed utilizing the same circuit elements.

The blending circuit illustrated in FIG. 1 is preferably included in an integrated circuit, and may be included on an integrated circuit that includes a 3-D graphics processing pipeline. Such a pipeline may perform rendering and blending operations associated with 3-D graphics processing. Such an integrated circuit may be incorporated in a personal computer for offloading graphics processing operations from the central processing unit (CPU) of the computer system.

The information required to perform such vertex blending operations may be received by the circuit of FIG. 1 over two separate interfaces. A state interface may provide the state information 12. The state information 12 may include the matrices associated with the vertex blending operation as well as the control information required for implementing the various steps included in the overall blending operation. The plurality of matrices received by the state buffer 10 as part of the state information 12 is stored within a matrix array 14. In one embodiment, the matrix array 14 includes a number of different sets of matrices 15–18, where each set of matrices may correspond to a different portion of the vertex blending operation.

In a particular embodiment, a first set of matrices 15 may correspond to model view matrices used for performing matrix calculations corresponding to the one or more positions associated with the current vertex blending operation. Model view matrices transform a vertex position from either object or model coordinates to eye coordinates. Many standard OpenGL calculations are performed in eye coordinates. Such calculations may relate to lighting processing, vertex fog processing, user clip plane processing, and texture coordinate generation. For example, if a skinning operation is to be performed as the vertex blending operation, a model view matrix corresponding to each of the separate objects that share the vertex would be included in the set of matrices 15. In the example where the skinning operation involves the movement of an arm having two component parts, one matrix may correspond to the lower arm portion, whereas the other matrix may correspond to the upper arm portion. This will be described in additional detail with respect to FIGS. 2 and 3 below.

The resulting blending vertex may include a number of separate portions, where one portion may correspond to a position for the blended vertex, and a second portion may correspond to a normal vector for the blended vertex. As such, a second set of matrices 16 within the matrix array 14 may correspond to inverse transposed model view matrices commonly used in matrix calculations involving normal vectors. The inverse transposed model view matrices are used to rotate a normal from object or model coordinates to eye coordinates. This rotated normal is used for lighting operations and texture coordinate generation.

A third set of matrices 17 may be included within the matrix array 14 for performing matrix calculations such that model-space to clip-space transformations can be performed (model to clip matrices). A model to clip matrix is derived by concatenating the model view matrix with a projection matrix. The model to clip matrix transforms a vertex position from object or model coordinates to clip coordinates. View volume and window clipping operations are typically performed in clip coordinates.

During standard transformation of a vertex corresponding to a primitive, the vertex position is rotated directly from model or object coordinates to clip coordinates for clipping. In an example embodiment, this may require four clocks for four dot products. If lighting, vertex fog, user clip planes, or texture coordinate generation for the vertex require the position of the vertex in eye coordinates, an additional four dot products may be performed to obtain the position of the vertex in eye coordinates. However, during skinning or morphing, the rotation from object coordinates to clip coordinates or object coordinates to eye coordinates may require significantly more than four clocks. As a result, for improved morphing/skinning performance, a different approach may be used where the position in object coordinates is morphed or skinned to eye coordinates, and then the projection matrix is used to transform the position from eye coordinates to clip coordinates (which requires only four clocks). As a result, the expensive skinning or morphing is performed only once. Unfortunately, numerical imprecision can arise between morphed or skinned vertices and those vertices which are not morphed or skinned.

For example, if vertex A has skinning enabled yet the vertex is completely owned by matrix 2 (the blend weight for matrix 2=1 and the blend weight for matrix 1=0), vertex A will be skinned to eye coordinates and then rotated from eye coordinates to clip coordinates through the projection matrix. If vertex B has skinning disabled, yet is in the same location as A, it may not be calculated to the same identical clip coordinate location since it is rotated directly from object coordinates to clip coordinates through the concatenated model to clip matrix associated with the matrix 2. In order to avoid the numerical imprecision, one technique is to use the concatenated model to clip matrix of matrix 2 and the matrix 1 to perform the skinning operation twice, where one skinning operation results in eye coordinates and the other results in clip coordinates. As is apparent to one of ordinary skill in the art, a tradeoff between performance and numerical precision exists, and different systems may perform differently based on the tradeoff.

A fourth set of matrices 18 included in the matrix array 14 may be associated with matrices for performing texture transform operations. Textures are commonly used in graphics applications to enhance displayed images in an efficient manner where a specific pattern or texture can be applied to an object or primitive. By including such texture transform matrices within the matrix array 14, the circuit illustrated in FIG. 1 can provide such texture transform capabilities.

Although the particular matrix array 14 illustrated in FIG. 1 is shown to include storage for 16 matrices, it is apparent to one of ordinary skill in the art that the size of the matrix array 14 can be altered to suit the particular system within which the circuit of FIG. 1 is used. Similarly, although the different sets of matrices 15–18 have been described such as to relate to particular matrix calculations, it should be understood that these different matrix storage locations are completely flexible in their mapping with regard to functionality. In other words, these matrices may be stored in any one of the storage locations included in the matrix array 14, and those matrix storage locations included in the various sets are not dedicated to storing any particular type of matrix.

The input vertex buffer 40 receives vertex data 42, where the vertex data 42 may be received over a vertex interface. The input vertex buffer 40 may include a position buffer 46 and a blend weight buffer 44. The vertex data 42 includes at least one position for each vertex blending operation, as well as one or more blend weights associated with the vertex blending operation. The input vertex buffer 40 may also include buffers for storing normal vectors, color values, and texture values.

The blend weights received for each operation are stored within the blend weight buffer 44. In a particular embodiment, each vertex blending operation is divided into up into four component operations, where each component operation may utilize a different blend weight. As such, the blend weight buffer 44 is shown to include at least four locations such that storage of all of the blend weights required for a particular vertex blending operation can be achieved.

The input vertex buffer 40 also preferably includes the position buffer 46, which includes at least a first position buffer location 47 and a second position buffer location 48. For skinning operations, only a single position will typically be included with the vertex data 42, and the position can be stored in either of the two position buffer locations 47 and 48. When a morphing operation occurs, two positions are typically included in the vertex data 42, and each of these positions is stored in a corresponding one of the position buffer locations 47 and 48 such that they can be individually used for different component operations. As is apparent to one of ordinary skill in the art, if additional graphics processing operations require vertex data that includes more than two positions, the position buffer 46 can be configured to support additional position buffer locations.

The arithmetic unit 30 performs the calculations associated with each component operation. The arithmetic unit 30 is preferably a floating-point unit that is capable of performing matrix calculations such as those described above. The transform controller 20 controls the particular calculations performed by the arithmetic unit 30 and also determines which of the various operands are included in each component operation calculation. Thus, the transform controller 20 determines which matrix out of the matrix array 14, which blend weight from the blend weight buffer 44, and which position from the position buffer 46 are combined by the arithmetic unit 30 during a particular component operation.

The arithmetic unit 30 may include an output vertex buffer 32 that stores the component results for each component operation such that the component results can be accumulated to determine the blended vertex 34 that is the result of the combination of the component results. As such, the output vertex buffer 32 may serve as a component operation result accumulator.

Figure 2:
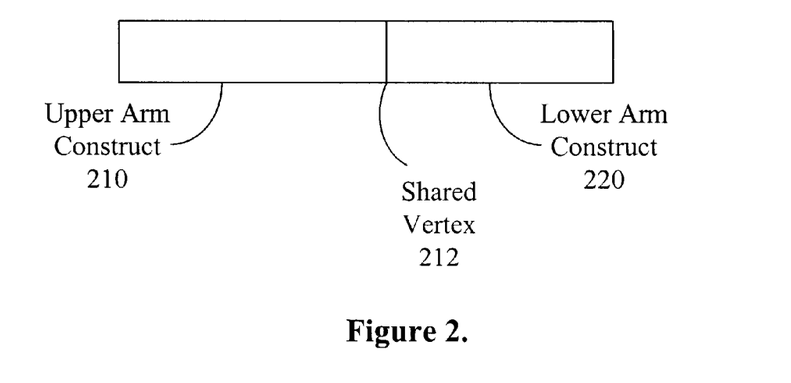
FIG. 2 illustrates objects that may be used in vertex blending operations performed by the circuit of FIG. 1.
Figure 3:
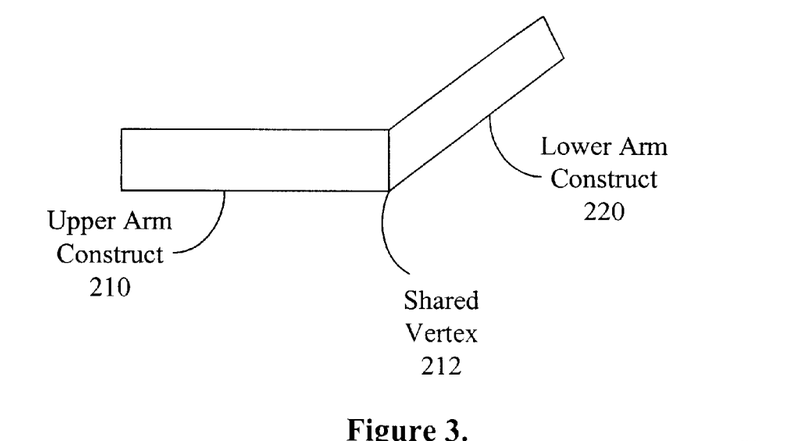
FIG. 3 illustrates the objects of FIG. 2 in a modified position.

FIGS. 2 and 3 have been provided in order to aid an understanding a skinning operation performed by the circuit of FIG. 1. FIG. 2 illustrates an upper arm construct 210 and a lower arm construct 220 in a first configuration. The upper and lower arm constructs 210 and 220 are separate objects that may be related in a manner similar to the way in which the upper and lower parts of an arm are related. As such, the upper and lower arm constructs 210 and 220 include one or more shared portions where the movement of one of the constructs may effect how the other construct is rendered on the display. A particular shared portion illustrated in FIG. 2 is the shared position 212, where the position is represented in three-dimensional coordinates (x, y, z, w).

If the lower arm construct 220 moves to a new orientation, as is shown in FIG. 3, the shared vertex 212 may be calculated based on both the current state of the lower arm construct 210 and the upper arm construct 220. Thus, the vertex corresponding to the shared vertex 212 effectively belongs to both the lower and upper arm constructs 210 and 220. The model view matrices corresponding to each of the upper and lower arms constructs 210 and 220 can be used to perform matrix calculations corresponding to the shared vertex where weighting factors are assigned to each calculation. The results of the two calculations are combined to produce a blended vertex that includes the new resulting shared vertex 212 of FIG. 3. The various calculations that may be performed in order to determine the blended vertex corresponding to the shared vertex 212 are listed below:

Skinning Vertex Blend Operation $$Position_{Result} = (BW_1)(M_{a1})(P_1) + (BW_2)(M_{a2})(P_1)$$

$$Normal_{Result} = (BW_1)(M_{b1})(N_1) + (BW_2)(M_{b2})(N_1)$$

As can be seen, the blended vertex may include a position portion and a normal portion. In more complex systems, one or more color or texture portions may also be included in the blended vertex The position result for the blended vertex is determined by adding the position component results of two component operations. The first position component result is calculated based on a first blending weight ($BW_1$) multiplied by the combination of the first model view matrix ($M_{a1}$) and the position of the shared vertex ($P_1$). The second position component result is calculated based on a second blending weight ($BW_2$), a second model view matrix ($M_{a2}$), and the position of the shared vertex ($P_1$). The blending weights ($BW_1$ and $BW_2$) determine the "ownership percentage" of the vertex by each of the upper and lower arm constructs 210 and 220. Thus, if the resulting position of the shared vertex will typically rely more heavily on the upper arm construct 210 the first blending weight ($BW_1$) will be greater than the second blending weight ($BW_2$).

Note that the blending operation formula illustrated above assumes that the vertex is only shared by two objects. In other embodiments, a vertex may be shared by up to four objects such that additional blending weights and model view matrices will be applied to the position of the shared vertex to determine the position portion of the blended vertex result. In yet other embodiments, a greater or lesser number of objects may share a particular vertex, such that additional blending weights and model view matrices may be required in some instances. As is apparent to one of ordinary skill in the art, the number of objects that may share a particular vertex may be determined based on the limitations of the particular system as implemented.

A second portion of the blended vertex is the normal portion that requires a similar set of component operations utilizing the normal vector ($N_1$) corresponding to the shared vertex. The matrices ($M_{b1}$ and $M_{b2}$) may correspond to inverse transform matrices associated with performing such normal matrix calculations. As stated above, additional portions of the blended vertex may include one or more color and texture portions that do not include matrix calculations but may utilize the same blend weights as were used in the normal and position portion calculations.

Thus, the resulting blended vertex includes a number of component portions. In the example illustrated above, two component portions are included. One component portion corresponds to the upper arm construct 210 and is associated with the first term of each of the equations. A second component portion is associated with the contribution of the lower arm construct 220 and includes the second terms of each of these equations shown. Note that both component portions rely on the position and normal vector corresponding to the shared vertex even though they utilize different matrices and blend weights in their calculations.

Figure 4:
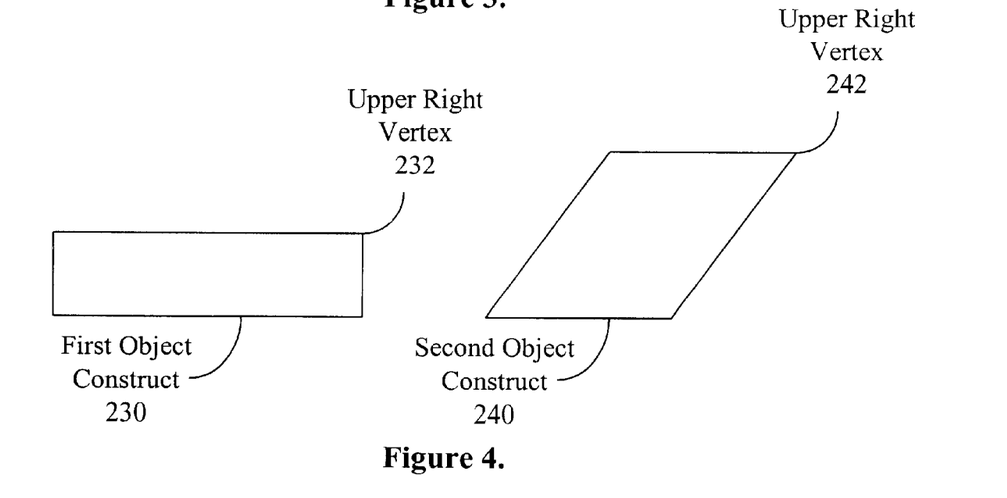
FIG. 4 illustrates objects that may be used in a morphing operation performed by the circuit illustrated in FIG. 1.

FIG. 4 illustrates a first object construct 230 and a second object construct 240. In an example morphing operation, the display initially shows the first object construct 230. This is followed by multiple intermediate images that include the result of blending the first and second object constructs 230 and 240. Finally, the second object construct 240 is displayed. In such a morphing operation, the vertex blending operations cause a transition for each vertex that gradually shifts from the characteristics of the vertex in the first object construct 230 to the characteristics of the vertex in the second object construct 240. For example, the first object construct 230 includes an upper right vertex 232, and the second object construct 240 includes an upper right vertex 242. Initially, the drawing operations utilize the characteristics of the upper right vertex 232 of the first object construct, and at the end of the morphing operation the drawing operations exclusively utilize the characteristics of the upper right vertex 242 of the second object construct 240. During the intermediate steps of the morphing operation, a blended vertex corresponding to contributions from both the upper right vertex 232 of the first object construct 230 and the upper right vertex 242 of the second object construct are utilized for drawing the images to the display.

The following equations indicate how such a morphing operation may take place:

Morphing Vertex Blend Operation $$Position_{Result} = (BW_1)(M_{a1})(P_1) + (BW_2)(M_{a2})(P_2)$$

$$Normal_{Result} = (BW_1)(M_{b1})(N_1) + (BW_2)(M_{b2})(N_2)$$

$$Color1_{Result} = (BW_1)(C_{11}) + (BW_2)(C_{21})$$

$$Texture1_{Result} = (BW_1)(T_{11}) + (BW_2)(T_{21})$$

Where $BW_1 + BW_2 = 1$ (in most cases)

As is illustrated, the blended vertex produced by the morphing vertex blend operation may include position, normal, color, and texture portions. In the case of the position portion, the position result is calculated by combining a first blend weight ($BW_1$), a first model view matrix ($M_{a1}$), and a first position ($P_1$) corresponding to the upper right vertex 232 of the first object construct 230. The second term in the position portion equation is based on the contribution from the second object construct 240. This term includes a second blending weight ($BW_2$), a second model view matrix corresponding to the second object construct 240 ($M_{a2}$), and the position corresponding to the upper right vertex 242 of the second object construct 240 ($P_2$). As can be seen from the position equation, the resulting position is a combination of two different blend weights, two different model view matrices corresponding to the two different constructs, and two different positions corresponding to the two different vertices. This is different from the skinning vertex blend operation where only a single position was present.

Referring back to FIG. 1, it can be seen that the circuit of FIG. 1 has been designed to allow for such morphing operations to be accommodated. Multiple position buffer locations 47 and 48 within the position buffer 46 allow the multiple positions for morphing operations to be stored together in the input vertex buffer 40. In prior art systems that may have been capable of performing skinning operations utilizing a single position, such morphing operations were forced to be performed using software, thus consuming valuable CPU processing bandwidth.

The other equations corresponding to the morphing vertex blend operation are similar to those for the skinning vertex blend operation with the exception that the normal portion includes contributions from two different normal vectors. The normal vectors are modified by two different inverse transform matrices corresponding to the first and second object constructs 230 and 240. The color equation utilizes color values from each of the constructs 230 and 240, as does the texture equation.

Note that the blending weights applied to each term in each equation are related such that the total blending weight is constant. As a morphing operation occurs, time intervals determine the particular blending weight applied to each term within the equation. Thus, in the initial state, the first blending weight ($BW_1$) will be equal to one and the second blending weight ($BW_2$) will be equal to zero. As the morphing operation moves from displaying the first object construct 230 to finally displaying the second object construct 240, the first blending weight will decrease as the second blending weight increases. The final result will be reached when the second blending weight reaches a value of one at which point the first blending weight will be equal to zero. It should be noted that some interesting effects can be created in morphing operations when $BW_1 + BW_2 <> 1$. For example, if $BW_1 + BW_2 < 1$, an expansion effect for the object may occur. Similarly, if $BW_1 + BW_2 < 1$, a contraction effect for the object may occur.

Typically, the matrices loaded into the matrix array 14 are relatively static with respect to multiple iterations of vertex data 42 provided to the input vertex buffer 40. Thus, the same matrices within the matrix array 14 can be used for multiple blending operations that utilize subsequent blend weights, subsequent control information, and subsequent vertex data that is loaded into the various portions of the system. As such, the overall throughput of the circuit illustrated in FIG. 1 can be increased such that new matrix array data need only be loaded when the perspective of the viewer or the general background environment is altered.

Figure 5:
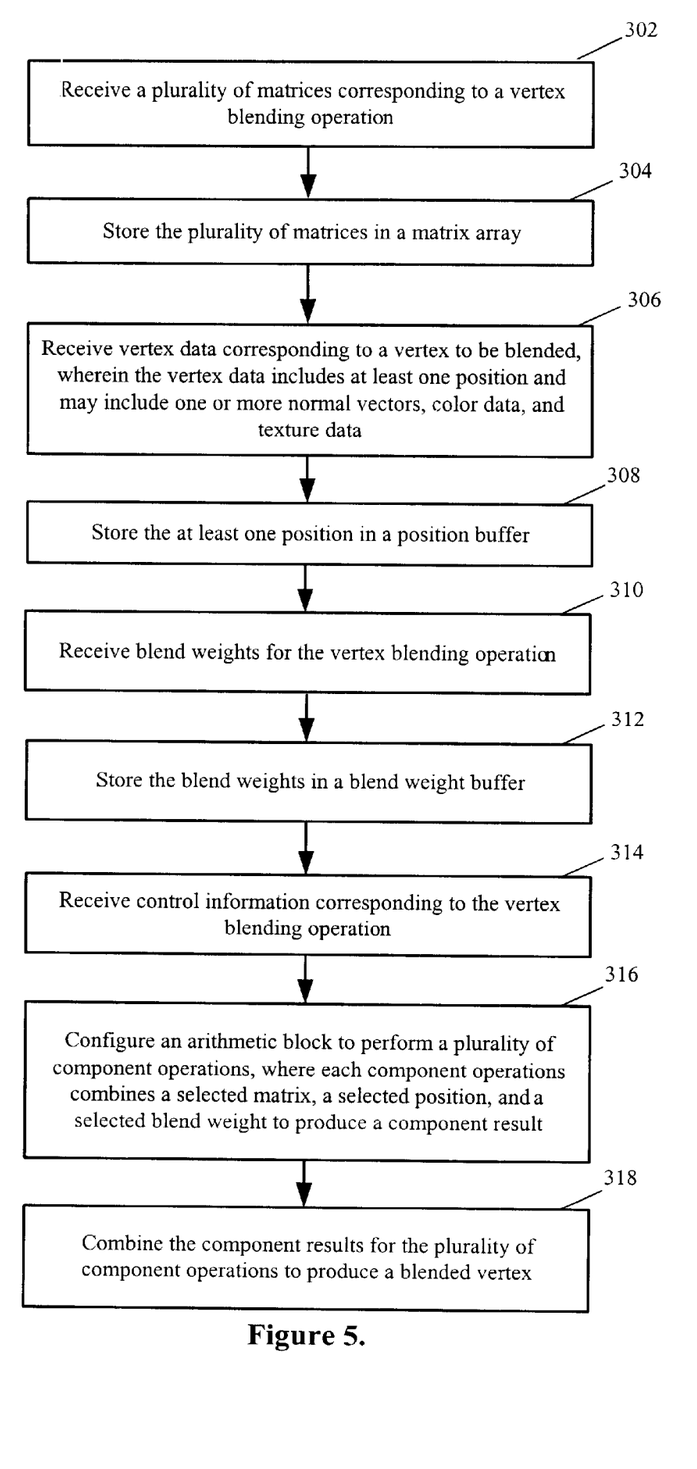
FIG. 5 illustrates a flow diagram of a method for vertex blending in accordance with the particular embodiment of the present invention.

FIG. 5 illustrates a flow diagram of a method for performing a vertex blending operation in a graphics system. The method of FIG. 5 begins at step 302 where matrices to be used in the vertex blending operation are received. As described with respect to the circuit of FIG. 1, these matrices may be received over a state interface.

At step 304, the matrices are stored in a matrix array. Preferably, the matrix array stores different types of matrices associated with different portions of the vertex blending operation. Thus, some matrices may be associated with model view matrices for blending positions, whereas other matrices may be associated with inverse transforms of these model view matrices that are typically utilized in performing normal vector blending operations. Thus, each vertex that is blended may include a number of different portions, where each of the portions is blended separately to produce the overall blended vertex. As described above, these portions can include a position portion, a normal portion, one or more color portions, and one or more texture portions.

At step 306, vertex data is received that includes at least one position. In the case of a skinning operation, the calculations performed will only require one position, as that position is shared between multiple objects. In the case of a morphing operation, distinct objects are being blended to form the result, and as such, each distinct object has a separate position that is utilized in the calculations for the blended vertex. As such, for a morphing operation, at least two positions will be received at steps 306.

At step 308, the at least one position received at step 306 is stored in a position buffer. As described above, the position buffer preferably includes a plurality of position buffer locations such that when morphing operations are performed, each of the positions associated with the morphing operation can be stored in the position buffer.

At step 310 blend weights corresponding to the vertex blending operation are received. The blend weights and positions may be received over a vertex interface. At step 312, these blend weights are stored in a blend weight buffer that has enough capacity to store all of the blend weights associated with the particular vertex blending operation occurring. Thus, in the case of a skinning operation where four objects include a shared vertex, four blend weights will be associated with the vertex blending operation such that the contributions to the final blended vertex from each of the four objects will each have a corresponding blend weight.

At step 314, control information corresponding to the vertex blending operation is received. This control operation indicates the specific component operations that are to be performed in order to attain the desired blended vertex. Such control information is used to select the appropriate blend weight, matrix, and position associated with each position portion component calculation. In the case where normal vectors are also being blended to produce the blended vertex, such control information will also indicate the appropriate matrices to be used in conjunction with the one or more normal vectors being blended as well as the blend weights.

At step 316, the arithmetic unit that performs the actual calculations used to perform the blending operation is configured to perform each of the component calculations associated with the vertex blending operation. As described above, each of these component operations may include a number of sub-portions, such as portions relating to position, normal, color, and texture portions. The arithmetic unit performs each of the component operations to produce a component result that may be stored in a temporary buffer prior to being combined with the component results for the other component operation to produce the blended vertex at step 318. The resulting blended vertex can thus have a position, normal vector, one or more colors, and one or more textures associated with it.

By providing dedicated hardware that is capable of performing both morphing and skinning operations, processor bandwidth formally utilized for performing complex processes such as morphing can be freed up for use in other operations. In addition, performing these calculations using hardware may be more efficient such that greater overall processing speeds can be achieved for the graphics display. By allowing the various components of the blending circuit to be fully configurable, numerous combinations of matrices, blend weights, positions, normal vectors, and the like can be used to achieve the various component portions included in the overall blended vertex result.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for performing a vertex blending operation in a graphics system, comprising:

receiving a plurality of matrices corresponding to the vertex blending operation;

storing the plurality of matrices in a matrix array;

receiving vertex data corresponding to a vertex to be blended, wherein the vertex data includes at least one position, wherein when the vertex blending operation is a skinning operation, the at least one position includes a skinning position, wherein when the vertex blending operation is a morphing operation, the at least one position includes a first morphing position and a second morphing position;

storing the at least one position in a position buffer;

receiving a plurality of blend weights corresponding to a plurality of component operations of the vertex blending operation;

receiving control information corresponding to the vertex blending operation;

configuring an arithmetic unit to perform the plurality of component operations based on the control information, wherein each component operation combines a selected matrix of the plurality of matrices, a selected position of the at least one position, and a selected blend weight of the plurality of blend weights to produce a component result corresponding to the component operation; and combining the component results for the plurality of component operations to produce a blended vertex.

2. The method of claim 1, wherein the vertex data further includes a normal vector for each position included in the at least one position, wherein for each component operation of the plurality of component operations:

the component operation includes a position portion and a normal portion, wherein the position portion of the component operation combines a selected model view matrix of the plurality of matrices, a selected position of the at least one position, and a selected blend weight of the plurality of blend weights to produce a position component result corresponding to the component operation, wherein the normal portion of the component operation combines a selected inverse transposed model view matrix of the plurality of matrices, a selected normal vector corresponding to the selected position of the at least one position, and the selected blend weight of the plurality of blend weights to produce a normal vector component result corresponding to the component operation, wherein the component result for the component operation includes the position component result and the normal vector component result.

3. The method of claim 2, wherein the vertex data further includes color data for each position included in the at least one position, wherein for each component operation of the plurality of component operations:

the component operation further includes a color portion, wherein the color portion of the component operation combines selected color data corresponding to the selected position of the at least one position and the selected blend weight of the plurality of blend weights to produce a color component result corresponding to the component operation, wherein the component result for the component operation includes the position component result, the normal vector component result, and the color component result.

4. The method of claim 2, wherein the vertex data further includes texture data for each position included in the at least one position, wherein for each component operation of the plurality of component operations:

the component operation further includes a texture portion, wherein the texture portion of the component operation combines selected texture data corresponding to the selected position of the at least one position and the selected blend weight of the plurality of blend weights to produce a texture component result corresponding to the component operation, wherein the component result for the component operation includes the position component result, the normal vector component result, and the texture component result.

5. The method of claim 1, wherein the plurality of matrices are received along a state interface and wherein the plurality of blend weights and the vertex data are received along a vertex interface.

6. The method of claim 1 further comprises receiving subsequent vertex data, subsequent blend weights, and subsequent control information corresponding to a subsequent blending operation that utilizes the plurality of matrices as stored in the matrix array.

7. The method of claim 1, wherein configuring further comprises:

when the vertex blending operation is a morphing operation, configuring the arithmetic unit such that a first component operation of the plurality of component operations combines the first morphing position with a first selected matrix and a second component operation of the plurality of component operations combines the second morphing position with the first selected matrix.

8. A vertex blending circuit for performing a vertex blending operation, comprising:

a state buffer operable to receive state information corresponding to the vertex blending operation, wherein the state information includes control information and a plurality of matrices, wherein the state buffer stores the plurality of matrices in a matrix array;

an input vertex buffer operable to receive a plurality of blend weights and vertex data corresponding to a vertex to be blended by the vertex blending operation, wherein the vertex data includes at least one position, wherein when the vertex blending operation is a skinning operation, the at least one position includes a skinning position, wherein when the vertex blending operation is a morphing operation, the at least one position includes a first morphing position and a second morphing position, wherein the input vertex buffer stores the plurality of blend weights and the vertex data;

an arithmetic unit operably coupled to the state buffer and the input vertex buffer; and a transform controller operably coupled to the state buffer and the arithmetic unit, wherein the transform controller receives the control information from the state buffer and configures the arithmetic unit to perform a plurality of component operations corresponding to the vertex blending operation based on the control information, wherein each component operation combines a selected matrix of the plurality of matrices, a selected position of the at least one position, and a selected blend weight of the plurality of blend weights to produce a component result corresponding to the component operation, wherein the transform controller further configures the arithmetic unit to combine the component results for the plurality of component operations to produce a blended vertex.

9. The vertex blending circuit of claim 8, wherein the arithmetic unit further comprises an output vertex buffer that stores at least one component result prior to combination of the component results for the plurality of component operations to produce the blended vertex.

10. The vertex blending circuit of claim 8, wherein the vertex data further includes a normal vector for each position included in the at least one position, wherein for each component operation of the plurality of component operations:

the component operation includes a position portion and a normal portion, wherein for the position portion of the component operation, the arithmetic unit combines a selected model view matrix of the plurality of matrices, a selected position of the at least one position, and a selected blend weight of the plurality of blend weights to produce a position component result corresponding to the component operation, wherein for the normal portion of the component operation, the arithmetic unit combines a selected inverse transposed model view matrix of the plurality of matrices, a selected normal vector corresponding to the selected position of the at least one position, and the selected blend weight of the plurality of blend weights to produce a normal vector component result corresponding to the component operation, wherein the component result for the component operation includes the position component result and the normal vector component result.

11. The vertex blending circuit of claim 10, wherein the vertex data further includes color data for each position included in the at least one position, wherein for each component operation of the plurality of component operations:

the component operation further includes a color portion, wherein for the color portion of the component operation, the arithmetic unit combines selected color data corresponding to the selected position of the at least one position and the selected blend weight of the plurality of blend weights to produce a color component result corresponding to the component operation, wherein the component result for the component operation includes the position component result, the normal vector component result, and the color component result.

12. The vertex blending circuit of claim 10, wherein the vertex data further includes texture data for each position included in the at least one position, wherein for each component operation of the plurality of component operations:

the component operation further includes a texture portion, wherein for the texture portion of the component operation, the arithmetic unit combines selected texture data corresponding to the selected position of the at least one position and the selected blend weight of the plurality of blend weights to produce a texture component result corresponding to the component operation, wherein the component result for the component operation includes the position component result, the normal vector component result, and the texture component result.

13. The vertex blending circuit of claim 8, wherein the plurality of matrices are received by the state buffer along a state interface and wherein the plurality of blend weights and the vertex data are received by the vertex buffer along a vertex interface.

14. The vertex blending circuit of claim 8, wherein the state buffer is operable to receive subsequent control information corresponding to a subsequent blending operation and wherein the vertex buffer is operable to receive subsequent vertex data and subsequent blend weights corresponding to the subsequent blending operation, wherein the subsequent blending operation utilizes the plurality of matrices as stored in the matrix array.

15. The vertex blending circuit of claim 8, wherein for a morphing operation, the transform controller configures the arithmetic unit such that a first component operation of the plurality of component operations combines the first morphing position with a first selected matrix and a second component operation of the plurality of component operations combines the second morphing position with the first selected matrix.

16. The vertex blending circuit of claim 8, wherein the vertex blending circuit is included in an integrated circuit.

17. The vertex blending circuit of claim 8, wherein the matrix array stores at least four matrices.

18. The vertex blending circuit of claim 17, wherein the matrix array stores at least sixteen matrices.

19. The vertex blending circuit of claim 8, wherein the plurality of component operations include up to four component operations.

20. The vertex blending circuit of claim 19, wherein the at least one position includes up to two positions.

21. A method for performing a vertex blending operation in a graphics system, comprising:

receiving a plurality of matrices corresponding to the vertex blending operation;

storing the plurality of matrices in a matrix array;

receiving vertex data corresponding to a vertex to be blended, wherein the vertex data includes at least one position, wherein when the vertex blending operation is a skinning operation, the at least one position includes a skinning position, wherein when the vertex blending operation is a morphing operation, the at least one position includes a first morphing position and a second morphing position;

storing the at least one position in a position buffer, wherein for a skinning operation, the skinning position is stored in a first position buffer location, wherein for a morphing operations, the first morphing position is stored in the first position buffer location and the second morphing position is stored in a second position buffer location;

receiving a plurality of blend weights corresponding to a plurality of component operations of the vertex blending operation;

storing the plurality of blend weights in a blend weight buffer;

receiving control information corresponding to the vertex blending operation;

configuring an arithmetic unit to perform the plurality of component operations based on the control information, wherein the arithmetic unit is operably coupled to the matrix array, the blend weight buffer, and the position buffer, wherein each component operation combines a selected matrix of the plurality of matrices, a selected position of the at least one position, and a selected blend weight of the plurality of blend weights to produce a component result corresponding to the component operation; and combining the component results for the plurality of component operations to produce a blended vertex.

22. A vertex blending circuit, comprising:

a state buffer that stores matrices, wherein at least a portion of the matrices correspond to view matrices for mapping vertices of video graphics primitives into an environmental setting;

a plurality of position buffers, wherein for morphing operations, multiple positions are included in the position buffers;

a blend weight buffer, wherein the blend weight buffer stores blend weights;

an arithmetic block operably coupled to the state buffer, the plurality of position buffers, and the blend weight buffer; and a transform controller operably coupled to the arithmetic block, the state buffer, the plurality of position buffers, and the blend weight buffer, wherein for each component operation of a plurality of component operations, the transform controller:

selects a selected matrix of the plurality of matrices;

selects a selected position stored in a selected one of the plurality of position buffers;

selects a selected blend weight from the blend weight buffer; and configures the transform controller to combine the selected matrix, the selected position, and the selected blend weight to produce a component result;

wherein the transform controller further configures the arithmetic block such that component results for the plurality of component operations are combined to produce a blended vertex.

* * * * *